United States Patent [19]

Tamayama et al.

[11] Patent Number: 5,319,450
[45] Date of Patent: Jun. 7, 1994

[54] CIRCUITRY FOR CANCELLING OFFSETS OF MULTIPLEXED COLOR VIDEO SIGNALS

[75] Inventors: Hiroshi Tamayama; Takashi Yano, both of Tokyo, Japan

[73] Assignee: Fuji Photo Film Co., Ltd., Kanagawa, Japan

[21] Appl. No.: 42,652

[22] Filed: Apr. 5, 1993

[30] Foreign Application Priority Data

Apr. 14, 1992 [JP] Japan .................................. 4-094252
Apr. 14, 1992 [JP] Japan .................................. 4-094284

[51] Int. Cl.$^5$ ............................................. H04N 9/72
[52] U.S. Cl. .................................................. 348/692
[58] Field of Search ................... 358/34, 171, 41, 174; H04N 9/72, 5/16, 5/18

[56] References Cited

U.S. PATENT DOCUMENTS

| | | | |
|---|---|---|---|
| 4,274,107 | 6/1981 | Tamura et al. ................. | 358/171 X |
| 4,682,211 | 7/1987 | Kaji .................................. | 358/34 X |
| 4,963,969 | 10/1990 | Kitaura et al. ...................... | 358/174 |
| 4,970,594 | 11/1990 | Kitaura et al. .................. | 358/174 X |
| 5,014,130 | 5/1991 | Heister et al. ..................... | 358/34 X |

FOREIGN PATENT DOCUMENTS

| | | | |
|---|---|---|---|
| 3733006 | 4/1989 | Fed. Rep. of Germany ......... | H04N 9/72 |
| 4212002 | 10/1992 | Fed. Rep. of Germany ......... | H04N 5/16 |
| 63-278471 | 11/1988 | Japan .............................. | H04N 5/18 |

*Primary Examiner*—Mark R. Powell

[57] ABSTRACT

Offset cancelling circuitry for cancelling offsets among the reference levels of a plurality of video signals each being associated with a particular color. The video signals are each applied to a particular differential amplifier. A multiplexer and a sample and hold circuit multiplex the video signals so as to output the video signal through a single circuit. An analog-to-digital converter converts the multiplexed video signals to corresponding digital data. The color-by-color digital data are each averaged and the resulting mean values are used as correction data. Alternatively, the digital data from the analog-to-digital converter may be transformed to analog data and then fed back to the differential amplifiers as detected and integrated correction data. Further, the multiplexed video signals may be clamped by a clamp buffer circuit and fed back to the differential amplifiers. As a result, offsets among the video signals are cancelled via the sample and hold circuit.

10 Claims, 9 Drawing Sheets

Fig.4B ANALOG INPUT SIGNAL

Fig.4F R DATA DETECTION

Fig.4G CORRECTION DATA

Fig.4H ADC 22 OUTPUT

→ TIME

Fig. 5

CIRCUITRY FOR CANCELLING OFFSETS OF MULTIPLEXED COLOR VIDEO SIGNALS

BACKGROUND OF THE INVENTION

1. Field of the Invention

The present invention relates to offset cancelling circuitry for correcting deviations, or offsets, in reference level among a plurality of video signals each being associated with a particular color and, more particularly, to offset cancelling circuitry advantageously applicable to a digital electronic still camera or similar video equipment.

2. Description of the Related Art

A digital electronic still camera or similar video equipment capable of converting an image to electric signals by, for example, solid state image sensors and storing them in a memory card is a recent achievement in the imaging art. The video signals to be applied from the image sensors to processing circuitry may be implemented as analog red (R), green (G) and blue (B) color signals each being derived from a particular color filter provided on an image pick-up cell array. The R, G and B signals are dot sequentially inputted to respective channels of the processing circuitry, subjected to level adjustment and other various kinds of signal processing including clamping, and then transformed to digital data by an analog-to-digital converter (ADC). Since circuitry with a highly accurate ADC is expensive, it has been customary to sequentially convert the color signals to digital data by a single line having a multiplexer and an ADC. The digital data are subjected to various kinds of digital processing including gamma correction and then written into a memory card. The gamma correction corrects a difference between the input characteristic of an image input system and the display characteristic of a cathode ray tube or similar display device, as well known in the art. The gamma correction is executed by the equipment which shoots a scene. A gamma curve representative of a correction characteristic is such that the amplification factor or gamma gain is high in a range where the input signal of the equipment is low, i.e., in a low luminance range.

However, the problem with the conventional circuitry built in digital electronic still camera is that there occurs deviations or offsets between the reference level and the R, G and B signals due to irregularities among the elements constituting the R, G and B channels of the circuitry. Then, the R, G and B signals sharing a single multiplexer and a single ADC are digitized by the ADC without having their offsets in reference level corrected and then the digitized signals undergo gamma correction. As a result, the offsets among the color signals are also amplified and superposed on the expected color signals as undesirable color deviation data. The color deviation data is especially serious when it involves data lying in a comparatively low luminance range where the gamma gain is high. As a result, an image with a low luminance cannot be accurately reproduced in respect of colors. To eliminate this problem, offset adjustment is effected channel by channel such that the R, G and B signals match one another with respect to the reference level. However, the conventional offset adjustment should be extremely accurate and should not change over a long period of time. Moreover, such offset adjustment is done by hand.

SUMMARY OF THE INVENTION

It is, therefore, an object of the present invention to provide offset cancelling circuitry which does not need manual adjustment of high accuracy.

In accordance with the present invention, the offset cancelling circuit for correcting a difference in reference level between a plurality of video signals fed from an image pick-up circuit and each being associated with a particular color has a signal generating circuit for generating color separation pulses in synchronism with a reference clock signal generated in the signal generating circuit and for generating clamp pulses and clock pulses in synchronism with black-out periods of the video signals. A multiplexer multiplexes the video signals from the image pick-up circuit in time serially in response to the color separation pulses from the signal generating circuit, and clamps the video signals in response to the clamp pulses from the signal generating circuit to thereby produce digital video signals via an ADC. A video signal detecting circuit detects, in response to the clamp pulses from the signal generating circuit, the digital video signals of respective colors fed from the ADC. A mean value calculating circuits calculates a mean value of clamp levels of the digital video signal detected by the associated video signal detecting circuit, and sequentially selects the mean values by a selector in response to the color separation pulses from the signal generating circuit. A correcting circuit is responsive to the video signals for correcting offsets of the video signals on the basis of the mean values.

Also, in accordance with the present invention, offset cancelling circuitry for correcting a difference in reference level between a plurality of video signals each being associated with a particular color has a plurality of amplifiers each being associated with a respective one of the video signals for correcting a DC level of the video signal in response to a DC voltage matching a control input. A multiplexer sequentially selects and thereby multiplexes video signals amplified by the amplifiers so as to output the video signals through a single circuit. A voltage source generates a reference voltage which constitutes a target for voltages of signals to be outputted by the multiplexer. A plurality of feedback paths are each associated with a respective one of the video signals for clamping the voltage of the associated signal outputted by the multiplexer and not lying in a video period, thereby applying a DC voltage matching a difference between the voltage and the reference voltage to the control input of an associated one of the plurality of amplifiers. A plurality of voltage storing devices are each associated with a respective one of the video signals for storing the DC voltage until the next video signal of corresponding color arrives, and each applies the DC voltage to the control input of an associated one of the amplifiers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings, in which are given by way of illustration only and thus are not limitative of the present invention, and wherein:

FIG. 3 shows a combination of FIGS. 3A and 3B;

DESCRIPTION OF THE PREFERRED EMBODIMENTS

Figures 1, 1A:
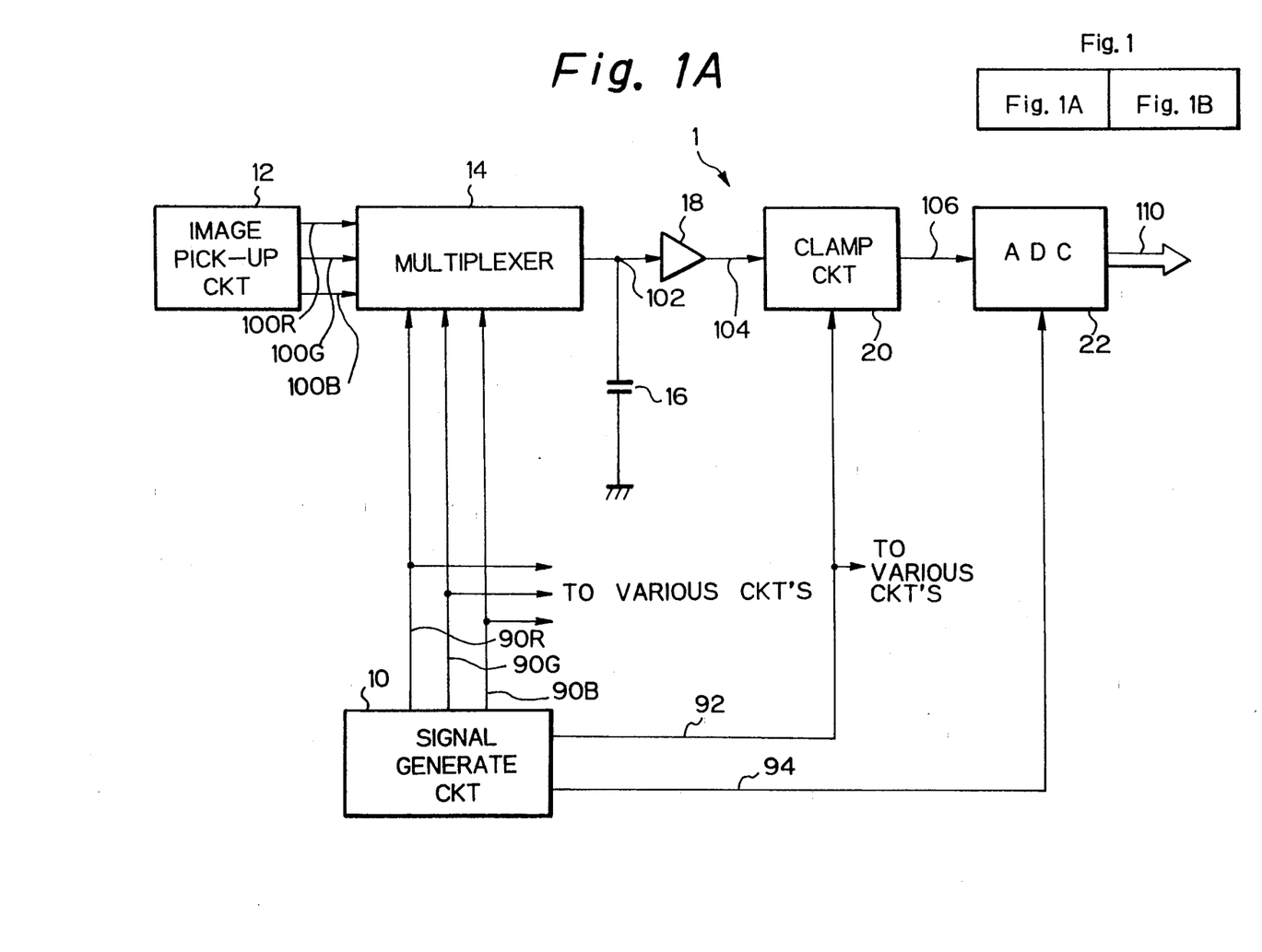
FIGS. 1A and 1B are block diagrams schematically showing, when combined as shown in FIG. 1, a digital electronic still camera implemented with offset cancelling circuitry embodying the present invention.
FIG. 1 shows a combination of FIGS. 1A and 1B.
Figure 1B:
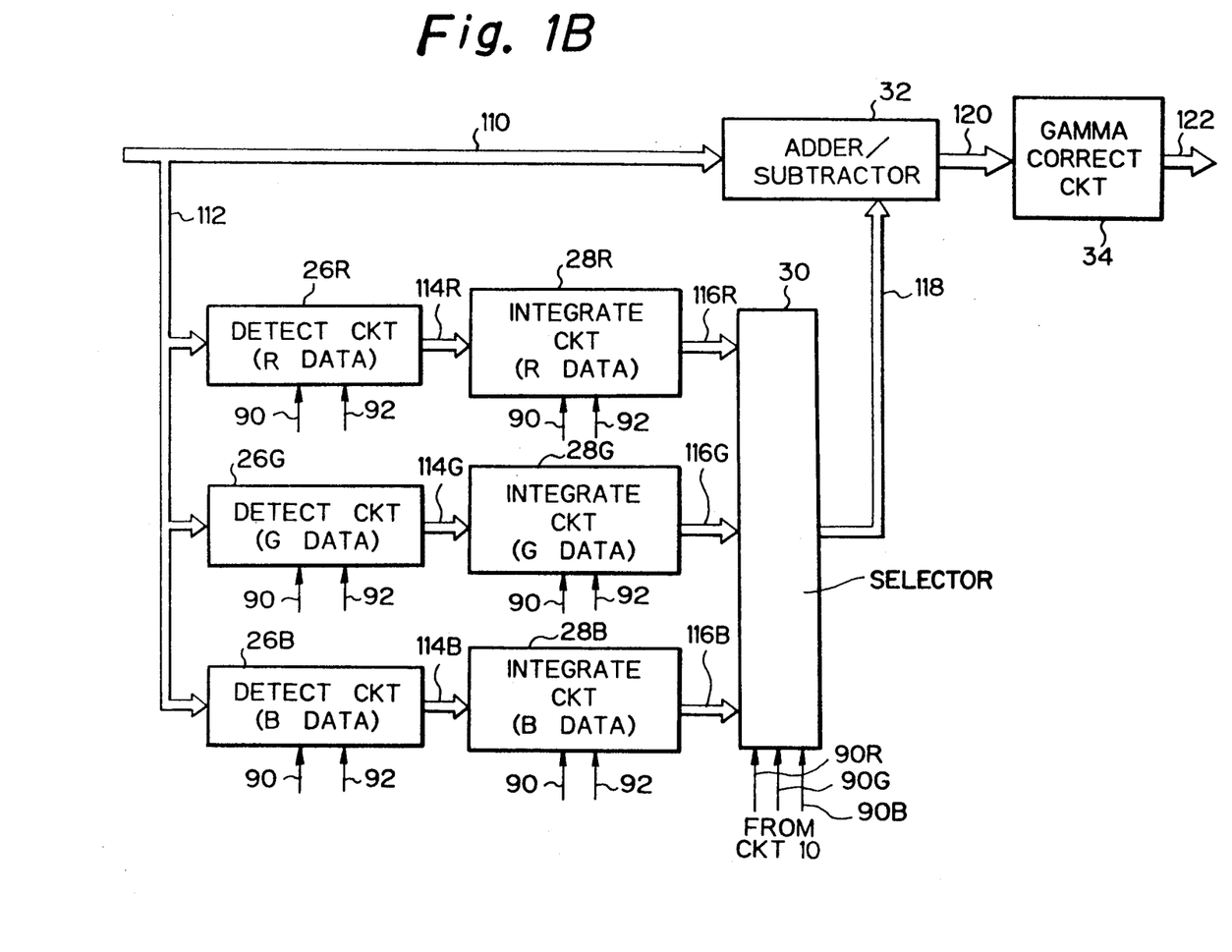

Referring to FIGS. 1A and 1B of the drawings, a digital electronic still camera implemented with offset cancelling circuitry embodying the present invention is shown. As shown, the offset cancelling circuitry, generally 1, has an image pick-up circuit 12 for picking up an image and outputting corresponding video signals in the form of R (red), G (green) and B (blue) signals. The, R, G and B signals are multiplexed by a multiplexer 14 and then transformed to digital data by an analog-to-digital converter (ADC) 22. The digital data are routed through buses 110 and 112, detecting circuits 26R, 26G and 26B, integrating circuits 28R, 28G and 28B, a selector 30 and an adder/subtractor 32, whereby offset components contained in the digital data are cancelled data by data. As a result, the circuitry 1 produces R, G and B data containing substantially no offset components. The, R, G and B data from the adder/subtractor 32 is subjected to gamma correction by a gamma correction circuit 34, then subjected to, for example, digital image processing, and finally written into a memory card, not shown. It is to be noted that arrangements not directly relevant to the present invention although included in the camera are not shown or described, and that the reference numerals attached to signals correspond to the those of the connection lines on which they appear.

Figure 2A:
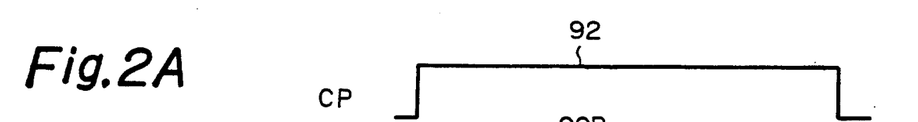
FIGS. 2A–2H are timing charts showing various signals appearing in the circuitry shown in FIGS. 1A and 1B.
Figure 2B:
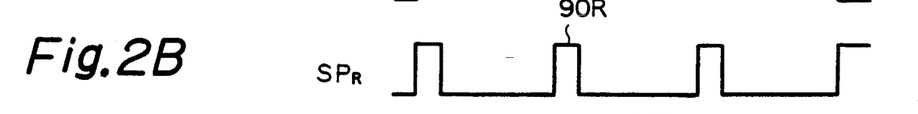
Figure 2C:
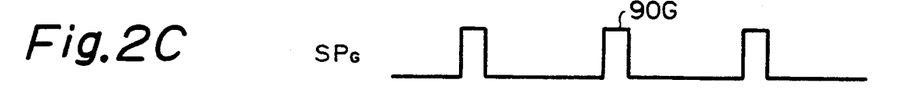
Figure 2D:
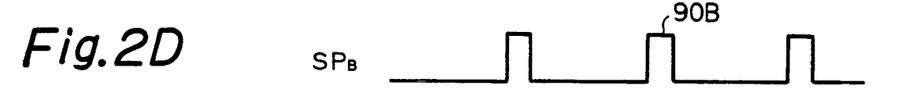

A signal generating circuit 10 delivers to each section of the camera a particular reference signal, not shown, in synchronism with a clock signal generated therein. Particularly, the signal generating circuit 10 produces color separation pulses $SP_R$, $SP_G$ and $SP_B$ shown in FIGS. 2B–2D on outputs 90R, 90B and 90B thereof, respectively. These pulses $SP_R$, $SP_G$ and $SP_B$ will be used to separate respectively the R signal representative of red, the G signal representative of green, and the B signal representative of blue. Further, the signal generating circuit 10 generates on an output 92 thereof a clamp pulse CP, FIG. 2A, which remains in a high level during the black-out period of the video signals, while generating a clock pulse CK on an output 92.

The image pick-up circuit 12 has CCD (Charge Coupled Device) image sensors, not shown, and transforms an image incident on the light-sensitive surface of each image sensor via an associated color filter into an electric signal. Specifically, the image pick-up circuit 12 generates a transfer clock signal in response to a particular reference signal from the signal generating circuit 10 and feeds it to the CCD image sensors for driving them. Also, the circuit 12 reads R, G and B signals each being associated with a particular color filter out of the CCD image sensors, amplifies them, and then delivers the resulting R, G and B signals from outputs 100R, 100G and 100B thereof to the multiplexer 14 in parallel.

The multiplexer 14 receives the parallel R, G and B signals from the image pick-up circuit 12 at the inputs 100R, 100G and 100B thereof, respectively. In response to the color separation pulses $SP_R$, $SP_G$ and $SP_B$ from the signal generating circuit 10, the multiplexer 14 sequentially selects the R, G and B signals so as to multiplex them time serially, i.e., on the same time axis. The multiplexed R, G and B signals appear on an output 102 which is connected to a buffer 18 and connected to ground via a capacitor 16. The multiplexer 14, capacitor 16 and buffer 18 cooperate as a sample and hold circuit. Specifically, the multiplexer 14 sequentially samples the R, G and B signals in response to the color separation pulses $SP_R$, $SP_G$ and $SP_B$, the capacitor 16 holds the sampled signals, and the buffer 18 outputs them. The output 104 of the buffer 18 is connected to the clamp circuit 20.

The clamp circuit 20 clamps the R, G and B signals fed from the output 104 of the buffer 18 and multiplexed time serially. Connected to the ADC 22 via an output 106, the clamp circuit 20 has a function of clamping the R, G and B signals in response to a clamp pulse CP fed from the signal generating circuit 10 during the blackout period of the R, G and B signals. Another function of the clamp circuit 20 is to shift the pedestal levels of the signals inputted thereto during the clamp period to match them to the input range of the ADC 22.

The ADC 22 converts the voltages of the R, G and B signals from the input 106 to digital data. Specifically, the ADC 22 samples and quantizes the R, G and B signals in response to a clock pulse CK from the signal generating circuit 10 to thereby generate, for example, 10-bit digital data. The 10-bit digital data are outputted as R, G and B data each having one of 1,024 quantizing levels. The digital R, G and B data are sequentially applied to the adder/subtractor 32, FIG. 1B, over the bus 110. The bus 112 which is, for example, the lower four bits of the bus 110 branches off the bus 110 and extends to the detecting circuits 26R, 26G and 26B, FIG. 1B. The detecting circuit 26R detects the R data out of the R, G and B data appearing on the bus 112. Specifically, this circuit 26R has a function of outputting, when supplied with both the clamp pulse CP and the color separation pulse $SP_R$ from the signal generating circuit 10, the data on the bus 112 to a 4-bit output bus 114R, i.e., a gating function. More specifically, the circuit 26R detects the R data during the clamp period and transfers it to the integrating circuit 28R over the bus 114R. Likewise, the detecting circuits 26G and 26B detect respectively the G data and B data in response to the color separation pulses SP$_G$ and SP$_B$ and transfers them to the associated integrating circuits 28G and 28B.

The integrating circuit 28R adds up the R data sequentially fed from the detecting circuit 26R so as to generate mean data representative of a mean value thereof. Specifically, the integrating circuit 28R has a function of adding up the R data applied thereto via the input bus 114R during the clamp period, a function of producing a mean of the R data, and a function of continuously transferring the mean data to the selector 30 over a 4-bit output bus 116R as correction data until the clamp pulse CP arrives. Likewise, the integrating circuits 28G and 28B generate respectively G data and B data in response to the color separation pulses SP$_G$ and SP$_B$ and transfers them to the selector 30 over respective output buses 116G and 116B.

The selector 30 sequentially connects the input buses 116R, 116G and 116B to a 4-bit output bus 118 thereof in response to the color separation pulses SP$_R$, SP$_G$ and SP$_B$ fed from the signal generating circuit 10. The output bus 118 is connected to the adder/subtractor 32. Connecting the input buses 110 and 118, the adder/subtractor 32 arithmetically processes the data arrived over the buses 110 and 118 and then outputs the resulting data on an output bus 120 thereof. Specifically, the adder/subtractor 32 subtracts one of the 10-bit data from the bus 110 and the 4-bit correction data from the bus 118 from the other while synchronizing them to each other. In this manner, the data are digitally processed to correct offsets of the R, G and B signals by the correction data, i.e., the mean values of reference level. This allows the gamma correction circuit 34 connected to the output bus 120 to execute processing stably.

The gamma correction circuit 34 compensates for a difference between the input characteristic of the image pick-up system and the display characteristic of a cathode ray tube or similar display device. Specifically, as the output data of the adder/subtractor 32 is applied to the input bus 120, the gamma correction circuit 34 executes accurate gamma correction with the data. The data undergone gamma correction is fed out via an output bus 122, subjected to various kinds of signal processing, and finally written to a memory card, not shown.

The operation of the offset cancelling circuitry 1 will be described with reference to FIGS. 2A-2H which shows various signals appearing during the black-out period of the video signals. First, when the camera with the circuitry 1 is in operation with a power switch, not shown, thereof turned on, the signal generating circuit 10 produces the color separation pulses SP$_R$, SP$_G$ and SP$_B$ on the outputs 90R, 90G and 90B, respectively. At the same time, the signal generating circuit 10 produces the clamp pulse CP on the output 92 and the clock pulse CK on the output 94.

Figure 2E:
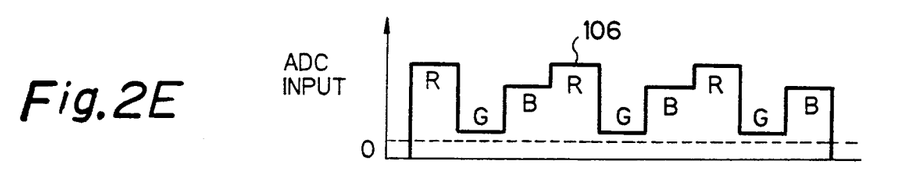

The image pick-up circuit 12 transforms an image focused onto the light-sensitive surfaces of the CCD image sensors via associated color filters to electric signals and delivers the resulting R, G and B signals via the outputs 100R, 100G and 100B, respectively. The R, G and B signals are sequentially selected by the multiplexer 14 in response to the color separation signals SP$_R$, SP$_G$ and SP$_B$ shown in FIGS. 2B-2D. As a result, the R, G and B signals are multiplexed by the multiplexer 14 on the same time axis, as shown in FIG. 2E specifically, while each being held by the capacitor 16 and buffer 18 for a predetermined period of time. In FIG. 2E, the R, G and B signals are shown as sequentially appearing in this order. The multiplexed, R, G and B signals are applied to the input circuit of the clamp circuit 20. In response, the clamp circuit 20 clamps the R, G and B signals by using, for example, the level indicated by a dashed line in FIG. 2E as a clamp level.

Figure 2F:
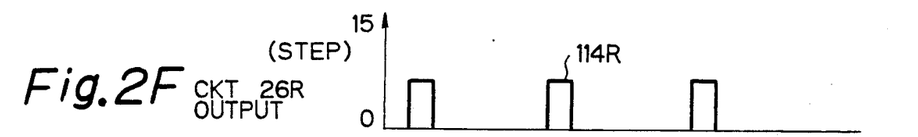

The clamp circuit 20 delivers the R, G and B signals to the ADC 22 in such a manner that the clamp level of the signals coincides with, for example, the zero input level of the ADC 22. The ADC 22 sequentially converts the R, G and B signals to digital data and produces the resulting digital R, G and B data on the output 110 in parallel. The R, G and B data are transferred from the ADC 22 to the adder/subtractor 32. At the same time, the lower four bits of the R, G and B data are applied to the detecting circuits 26R, 26G and 26B over the input bus 112. When both the clamp pulse CP and the color separation pulse SP$_R$, SP$_G$ or SP$_B$ become significant, the detecting circuit 26R, 26G or 26B outputs the associated color data. For example, the detecting circuit 26R detects, among the data appearing on the input bus 112, the R data when both the clamp pulse CP and the color separation pulse SP$_R$ are received, delivering the R data via the output bus 114R as 4-bit digital data. As a result, the R data sequentially appear on the output bus 114R in synchronism with the color separation pulses SPR, as shown in FIG. 2F. In FIG. 2F, the R data are represented by 4-bit 16-step data by way of example. The lower four bits of the G data and the lower four bits of the B data are sequentially delivered over the output buses 114G and 114B, respectively.

Figure 2G:
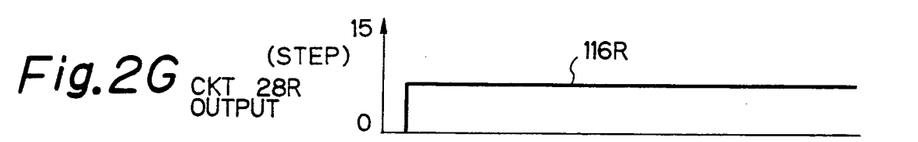

The data from the detecting circuits 26R, 26G and 26B are applied to the input buses 114R, 114G and 114B of the integrating circuits 28R, 28G and 28B, respectively. The integrating circuits 28R, 28G and 28B each adds up the input data over the clamp period so as to produce a mean value thereof. For example, as shown in FIG. 2G, the integrating circuit 28R produces a mean value of the R data while delivering it over the output bus 116R as correction data, until the next clamp pulse CP arrives. Likewise, the lower four bits of the G data and the lower four bits of the B data are respectively delivered over the output buses 116G and 116B as correction data. The data from the output buses 116R, 116G and 116B are applied to the selector 30.

Figure 2H:
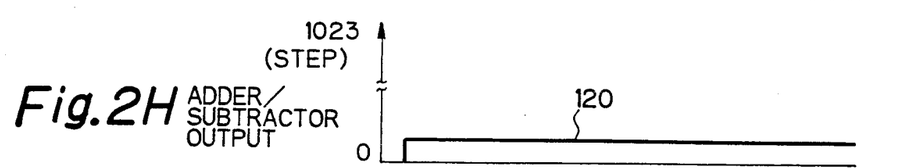

The selector 30 sequentially selects the data on the buses 116R, 116G and 116B in response to the color separation pulses SP$_R$, SP$_G$ and SP$_B$ fed from the signal generating circuit 10 while transferring the correction data R, G and B to the adder/subtractor 32 over the output bus 118. Also transferred to the adder/subtractor 32 over the input bus 110 are the 10-bit R, G and B data. Hence, the adder/subtractor 32 subtracts each of the correction data R, G and B from associated ones of the R, G and B data and sequentially produces the resulting residuals on the output bus 120. As a result, during the clamp period, the output bus 120 of the adder/subtractor 32 remains at a constant level due to the cancellation of the offsets of the color data, as shown in FIG. 2H. The correction data of the respective colors are also sequentially subtracted from video data transferred after the black-out period, the resulting residuals appearing on the output bus 120. Consequently, the adder/subtractor 32 produces data containing substantially no offset components on the output bus 120.

The offset-free data from the adder/subtractor 32 are applied to the input bus 120 of the gamma correction circuit 34 and subjected to accurate gamma correction on the basis of a correction curve for digital gamma correction. The corrected data are written to a memory card, not shown, after various kinds of signal processing.

Figure 3A:
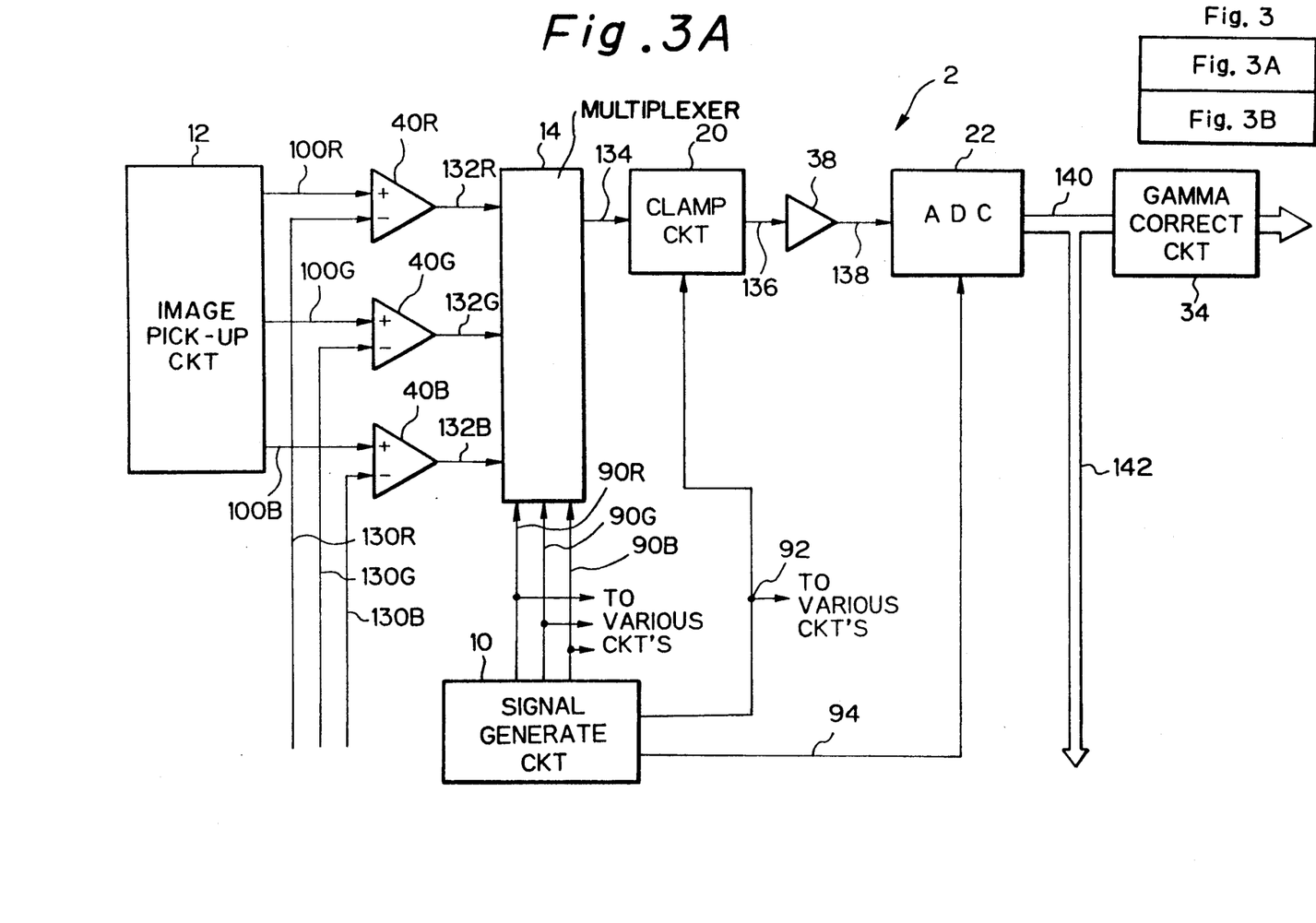
FIGS. 3A and 3B are block diagrams schematically showing, when combined as shown in FIG. 3, a digital electronic still camera implemented with an alternative embodiment of the present invention.
Figure 3B:
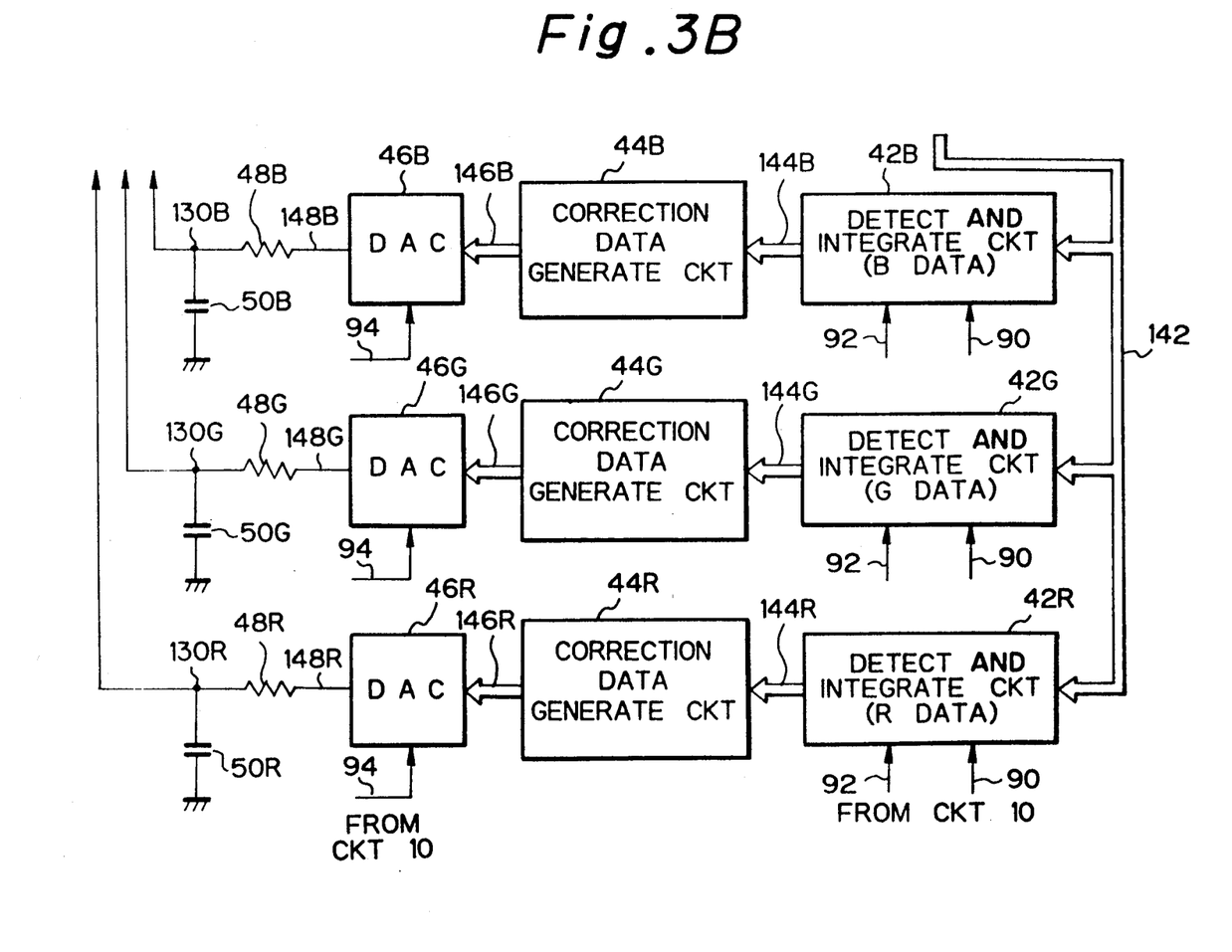

A reference will be made to FIGS. 3A, 3B and 4 for describing an alternative embodiment of the present invention which is also applied to a digital electronic still camera. The constituents of this embodiment which are identical with or similar to those of the previous embodiment are designated by the same reference numerals, and a detailed description will not be made to avoid redundancy. As shown, offset cancelling circuitry 2, like the circuitry 1 shown in FIGS. 1A and 1B, produces offset-free R, G and B data from the R, G and B signals generated by the image pick-up circuit 12. The signal generating circuit 10, image pick-up circuit 12, multiplexer 14, clamp circuit 20, ADC 22 and gamma correction circuit 34 shown in FIG. 3A and 3B may be constructed in the same manner as those of FIG. 1A and 1B. The difference is that this embodiment additionally includes feedback clamp circuits for feeding back the lower four bits of the output data of the ADC 22 to the input side. Specifically, the offset cancelling circuitry 2 further comprises a buffer 38, differential amplifiers 40R, 40G and 40B, detecting and integrating circuits 42R, 42G and 42B, correction data generating circuits 44R, 44G and 44B, digital-to-analog converters (DACs) 46R, 46G and 46B, resistors 48R, 48G and 48B and capacitors 50R, 50G and 50B, as illustrated.

In detail, the outputs 100R, 100G and 100B of the image pick-up circuit 12 are connected to the noninverting inputs (+) of the differential amplifiers 40R, 40G and 40B, respectively, which are fed with inverting inputs (−) 130R, 130G and 130B. The differential amplifiers 40R, 40G and 40B each produce an output representative of a difference between the signal applied to the noninverting input and a signal applied to the inverting input (−). The outputs 132R, 132G and 132B of the differential amplifiers 40R, 40G and 40B, respectively, are connected to the multiplexer 14 whose output 134 is in turn connected to the clamp circuit 20. The output 136 of the clamp circuit 20 is connected to the buffer 38. The buffer 38 plays the role of a preamplifier for amplifying the output signal of the clamp circuit 20, i.e., for producing adequate R, G and B signals matching the ADC 22 connected to the output 138 thereof. The ADC 22 is connected to the gamma correction circuit 34 by a 10-bit bus 140. A bus 142 branches off the bus 140 and extends to the detecting and integrating circuits 42R, 42G and 42B, FIG. 3B. The bus 142 is representative of the lower four bits of the output signal of the ADC 22.

The detecting and integrating circuit 42R detects R data out of the R, G and B data appearing on the bus 142, adds up the consecutive R data, and then produces mean data representative of a mean value of the R data. Specifically, this circuit 42R detects R data appearing during the clamp period in response to the clamp pulse CP and color separation pulses $SP_R$ from the signal generating circuit 10, thereby outputting the mean data. The circuit 42R may be implemented as a combination of the detecting circuit 26R and integrating circuit 28R shown in FIG. 1B. The mean data of the R data is fed from the circuit 42R to the correction data generating circuit 44R connected to the output bus 144R of the circuit 42R. Likewise, the detecting and integrating circuits 42G and 42B detect respectively G data and B data in response to the color separation pulses $SP_G$ and $SP_B$, produce mean data of the respective color data, and then deliver them to the associated correction data generating circuits 44G and 44B.

The correction data generating circuit 44R generates data for correcting an offset on the basis of the mean data from the detecting and integrating circuit 42R. Specifically, on receiving the mean data including an offset on the input bus 144R, the circuit 44R generates 4-bit correction data to provide the mean data with a predetermined reference value and then transfers the correction data to the DAC 46R which is connected to an output bus 146R. Likewise, the correction data generating circuits 44G and 44B generate correction data associated with G data and B data, respectively.

The DAC 46R converts the correction data of four bits from the correction data generating circuit 44R to an analog voltage in response to the clock CK from the signal generating circuit 10, the analog voltage appearing on an output bus 148R. The output bus 148R is connected to the inverting input 130R of the differential amplifier 40R via the resistor 48R. The inverting input 130R is connected to ground via the capacitor 50R. The capacitor 50R, therefore, accumulates and memorizes the voltage applied to the terminal 130R. The detecting and integrating circuit 42R, correction data generating circuit 44R, DAC 46R and resistor 48R constitute a feedback path to the differential amplifier 40 in combination. In this configuration, as the voltage stored in the capacitor 50R rises, the potential difference between the two inputs to the differential amplifier 40R is reduced in a relative sense to in turn lower the signal level on the output 132R of the amplifier 40R. Conversely, on the fall of the voltage stored in the capacitor 50R, the potential difference between the inputs to the differential amplifier 40R and, therefore, the signal level on the output 132R is increased in a relative sense. In this manner, a feedback clamp circuit is implemented which generates correction data from the lower 4-bit data produced by the ADC 22, transforms the correction data to an analog voltage, stores the analog voltage in the capacitor 50R, and then negatively feeds it back to the differential amplifier 40R. Likewise, the DACs 46G and 46R, resistors 48G and 48B and capacitors 50G and 50B cooperate to generate correction voltages associated with G data and B data, respectively.

Figure 4A:
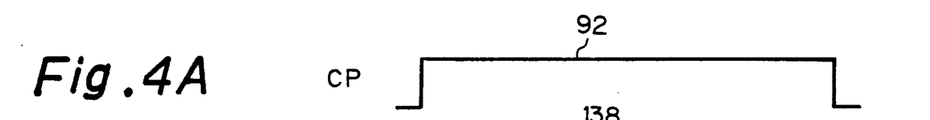
FIGS. 4A–4H are timing charts showing various signals appearing in the embodiment of FIGS. 3A and 3B.
Figure 4B:
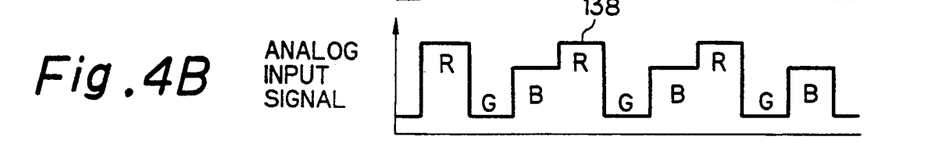
Figure 4C:
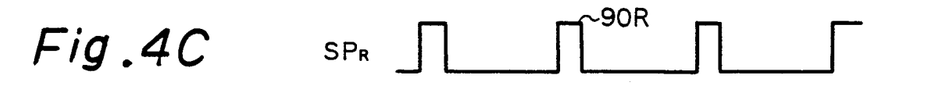
Figure 4D:
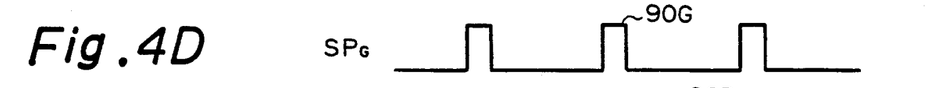
Figure 4E:
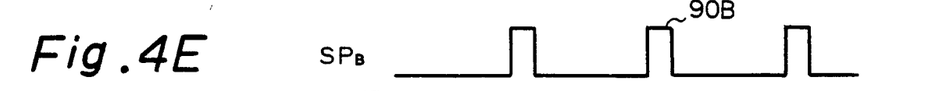

The operation of the illustrative embodiment will be described with reference to FIGS. 4A–4H which show the various signals appearing during the black-out period of the video signals. First, when the camera with the circuitry 2 is in operation, the signal generating circuit 10 produces the color separation pulses $SP_R$, $SP_G$ and $SP_B$ on the outputs 90R, 90G and 90B, respectively, as shown in FIGS. 4C–4E. At the same time, the signal generating circuit 10 produces the clamp pulse CP, FIG. 4A, on the output 92 and the clock pulse CK on the output bus 94.

The image pick-up circuit 12 transforms an image focused onto the light-sensitive surfaces of the CCD image sensors via associated color filters to electric signals and delivers the resulting R, G and B signals to the noninverting inputs 100R, 100G and 100B of the differential amplifiers 40R, 40G and 40B, respectively. Signals to be applied to the inverting inputs 130R–130B of the differential amplifiers 40R–40B are generated by the following procedure.

First, the differential amplifiers 40R, 40G and 40B produce respectively outputs representative of differences between the R, G and B signals delivered to the noninverting inputs (+) 100R, 100G and 100B and the voltages applied to the inverting inputs (−) 130R, 130G and 130B on their outputs 132R, 132G and 132B. The multiplexer 14 multiplexes the outputs of the differential amplifiers 40R–40B time serially to produce a signal in which the R, G and B signals appear one after another and output through a single circuit 134. The R, G and B signals are sequentially fed to the clamp circuit 20 via the output circuit 134 of the multiplexer 14 and then to the buffer 38. As a result, a signal shown in FIG. 4B is generated in which the R, G and B signals sequentially appear and to which a predetermined DC voltage is added to match it to the predetermined input level of the ADC 22. The R, G and B signals are applied to the input 138 of the ADC 22 to be converted to 10-bit digital data. The lower four bits of the 10-bit data are transferred to the detecting and integrating circuits 42R, 42G and 42B over the bus 142.

Figure 4F:
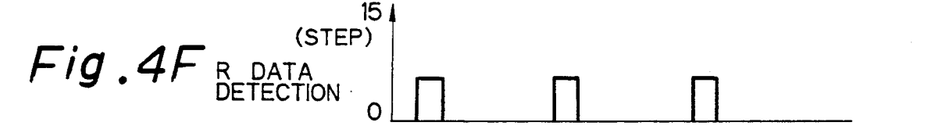

The detecting and integrating circuit 42R, for example, selects the R data out of the 4-bit R, G and B data appearing on the input bus 142 in response to the clamp pulse CP and color separation pulse $SP_R$. The R data appears on the input bus 142 every time the color separation pulse $SP_R$ arrives at the detecting and integrating circuit 42R, as shown in FIG. 4F in the form of steps representative of digital numerical values. The circuit 42R adds up the R data appearing in the clamp period in response to every color separation pulse $SP_R$ and then produces a mean value thereof. The mean value or mean data continuously appears on the output 144R of the circuit 42R over a predetermined period of time until the next clamp pulse CP arrives, as indicated by a dashed line in FIG. 4G by way of example.

Figure 4G:
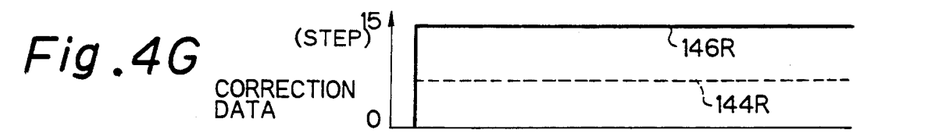

On receiving the mean data, the correction data generating circuit 44R generates correction data such that the R data sequentially arriving during the clamp period have a predetermined reference level, as shown in FIG. 4G by way of example. The correction data is fed to the input 146R of the DAC 46R via the output 146R of the correction data generating circuit 44R. The DAC 46R converts the correction data to an analog voltage and then delivers the voltage to the capacitor 50R via the resistor 48R, thereby charging the capacitor 50R. At this instant, the charging voltage is fed back to the inverting input 130R of the differential amplifier 40R forming a feedback loop. Likewise, the detecting and integrating circuits 42G and 42B detect respectively the G data and B data out of the R,G and B data and produce mean data thereof. The correction data generating circuits 44G and 44B generate correction data on the basis of the G data and B data, respectively. The correction data from these circuits 44G and 44B are each converted to an analog correction voltage and then applied to the associated capacitor 50G or 50B via the resistor 48G or 48B while being fed back to the differential amplifier 40G or 40B.

Figure 4H:
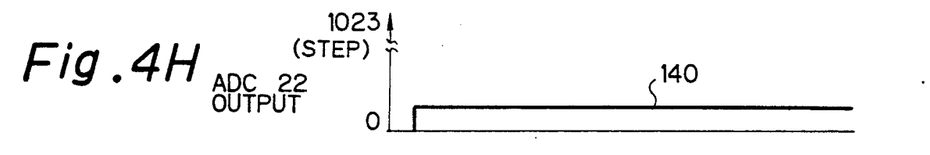

The differential amplifiers 40R, 40G and 40B produce respectively the differences between the correction voltages applied to the inverting inputs 130R, 130G and 130B and the R, G and B signals applied to the noninverting inputs 100R, 100G and 100B and then amplify them. As a result, the signal voltages appearing on the outputs 132R, 132G and 132B of the differential amplifiers 40R, 40G and 40B each has a constant level. These voltages are multiplexed by the multiplexer 14, clamped by the clamp circuit 20, and then applied to the buffer 38 through the single circuit 136. After the R, G and B signals have been amplified by the buffer 38, they are converted to digital data by the ADC 22. The resulting output of the ADC 22 is shown in FIG. 4H.

As stated above, the R, G and B signals are respectively applied to the noninverting inputs 100R, 100G and 100B of the differential amplifiers 40R, 40G and 40B during a clamp period. The clamp levels of the R, G and B signals during the black-out period are each corrected to a predetermined level by a correction voltage generated color by color and applied to the associated inverting input 130R, 130G or 130B. The correction voltages are stored in the associated capacitors 50R, 50G and 50B until the clamp period of the next blackout period. After this clamping period, R, G and B signals representative of an image are applied from the image pick-up circuit 12 to the noninverting inputs 100R, 100G and 100B while correction voltages stored in the capacitors 50R, 50G and 50B are applied to the inverting inputs 130R, 130G and 130B. This cancels offsets among the R, G and B signals which will appear on the outputs 132R, 132G and 132B of the differential amplifiers 40R, 40G and 40B, respectively. Therefore, the resulting color signals on the outputs 132R, 132G and 132B are substantially identical in respect of an offset component. These color signals are multiplexed by the multiplexer 14, clamped by the clamp circuit 20, provided with a DC component so as to be outputted through the single circuit formed by the circuits 134, 136 and 138, and then amplified by the buffer 38. The R, G and B signals from the buffer 38 are converted to 10-bit digital data by the ADC 22 and then transferred to the gamma correction circuit 34. This is followed by the same procedure as in the embodiment shown in FIGS. 1A, 1B and 2. At this instant, although the lower four bits of color data are applied to the detecting and integrating circuits 42R–42B over the bus 142, the circuits 42R–42B do not detect the color data since the clamp pulse CP are not applied thereto. This particular embodiment effectively uses the input range or dynamic range of the ADC 22 since the input to the ADC 22 is free from offsets.

Figure 5:
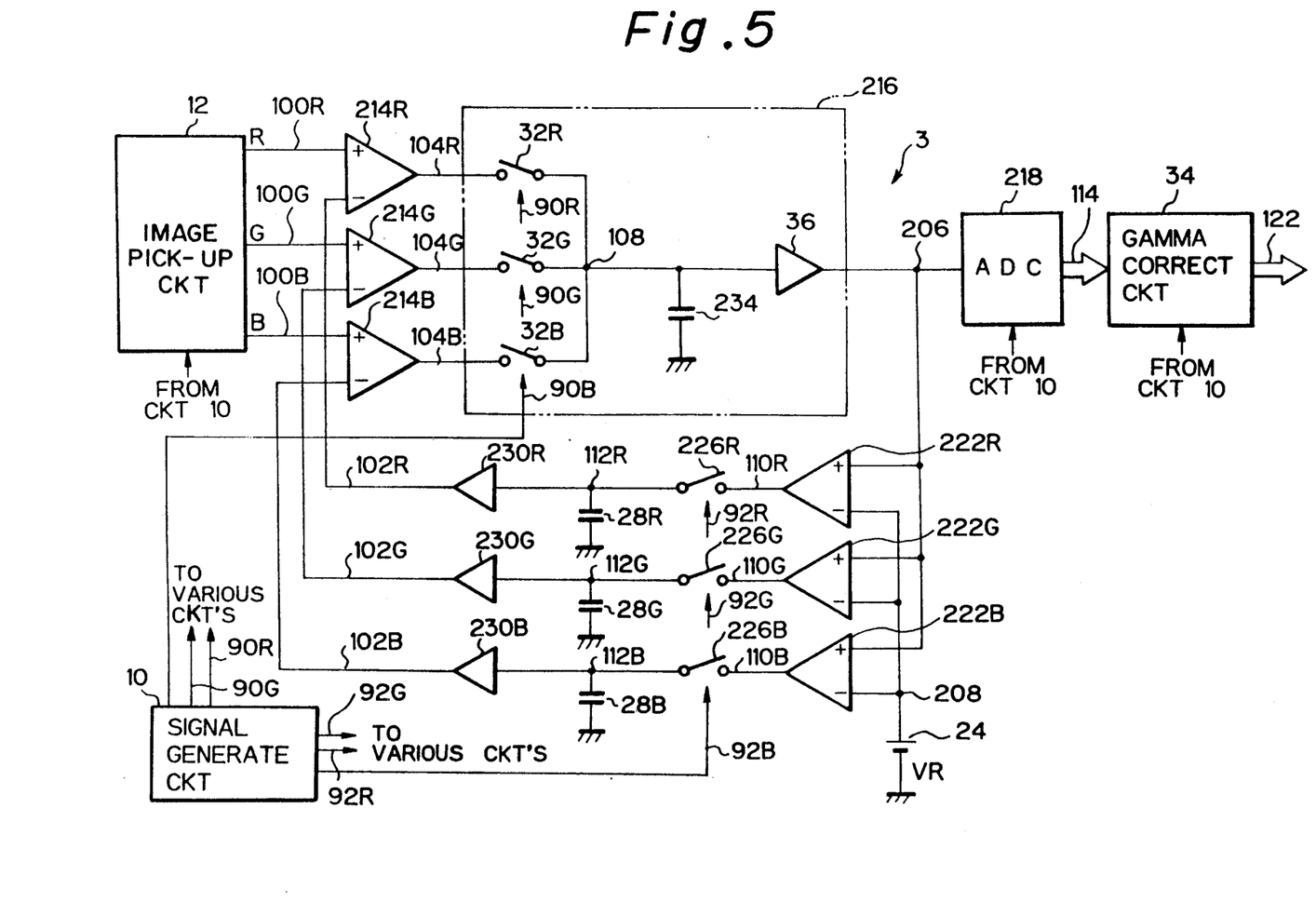
FIG. 5 is a block diagram schematically showing another alternative embodiment of the present invention.

Referring to FIG. 5, another alternative embodiment of the present invention will be described which is also applied to a digital electronic still camera. In this embodiment, the same or similar constituents as or to the previous embodiments are designated by the same reference numerals, and a detailed description will not be made to avoid redundancy. As shown, offset cancelling circuitry, generally 3, has a sample and hold circuit 216 for multiplexing R, G and B signals fed from the image pick-up circuit 12, and an ADC 218 to which the resulting R, G and B signals are applied through a single circuit 206 time serially. Differential amplifiers 214R, 214G, 214B, 222R, 222G and 222B, switches 226R, 226G and 226B, capacitors 28R, 28G and 28B and buffers 230R, 230G and 230B constitute feedback clamp circuits for producing offset-free multiplexed R, G and B signals. There are also shown in the figure the signal generating circuit 10, gamma correction circuit 34, and a reference voltage source 24. It is to be noted that R, G and B stand for red data, green data, and blue data, respectively.

The signal generating circuit 10 delivers to each section of the camera a particular reference signal, not shown, in synchronism with a clock built therein. As shown in FIGS. 6A–6G, the circuit 10 generates a clamp signal CP which goes high in synchronism with a clamp period 50 included in one horizontal scanning period or 1H period of the video signals. Particularly, as shown in FIGS. 6A-6D, the circuit 10 sequentially produces clamp signals $CP_R$, $CP_G$ and $C_P$ on outputs 92R, 92B and 92B thereof, respectively. Since the embodiment deals with three primary color signals, i.e., R, G and B signals, the clamping periods 50R, 50G and 50B each goes high every 3H period of the video signals. Further, as shown in FIGS. 6E-6G, the circuit 10 sequentially generates color separation signals $SP_R$, $SP_G$ and $SP_B$ in the video period 52 of the video signals on outputs 90R, 90G and 90B thereof, respectively. The color separation signals $SP_R$, $SP_G$ and $SP_B$ separate respectively an R signal, a G signal and a B signal representative of red, green and blue. Specifically, the circuit 10 generates these signals $SP_R$, $SP_G$ and $SP_B$ such that when the clamp signal CP of corresponding color appears in, among others, the clamp period 50, each of them goes high during the clamp period of the color signal, e.g., in synchronism with the clamp period 50R while remaining in a low level in the other clamp periods 50G and 50B.

The image pick-up circuit 12 has CCD image sensors, not shown, and transforms an image incident on the photosensitive surface of each image sensor via an associated color filter into an electric signal. Specifically, this circuit 12 generates a transfer clock signal in response to a particular reference signal from the signal generating circuit 10 and feeds it to the CCD image sensors for driving them. Also, the circuit 12 reads R, G and B signals each being associated with a particular color filter out of the CCD image sensors, amplifies them, and then delivers the resulting R, G and B signals from outputs 100R, 100G and 100B thereof in parallel. The outputs 100R, 100G and 100B are connected to the noninverting inputs of differential amplifiers 214R, 214G and 214B, respectively.

The differential amplifier 214R amplifies a difference between the R signal applied to the noninverting input 100R and a signal applied to an inverting input 102R. The resulting output of the differential amplifier 214R is fed to a sample and hold circuit 216. The differential amplifiers 214G and 214B are identical in construction with the differential amplifier 214R and respectively connected to the outputs 100G and 100B of the image pick-up circuit 12. The outputs 104G and 104B of the differential amplifiers 214G and 214B are also connected to the sample and hold circuit 216.

The sample and hold circuit 216 has switches 32R, 32G and 32B constituting a multiplexer in combination with a capacitor 234, and an amplifier 36. This circuit samples the signals applied to the inputs 104R, 104G and 104B thereof and holds a voltage on an output 108, for a predetermined period of time. Specifically, the switches 32R, 32G and 32B are respectively opened and closed by the color separation signals $SP_R$, $SP_G$ and $SP_B$ fed from the signal generating circuit 10, thereby producing a multiplexed output for one line circuit. For example, the switch 32R has the contacts thereof repetitively connected by the color separation signals $SP_R$ sequentially applied thereto, gating the R signal on the input 100R. Likewise, the switches 32G and 32B gate respectively the G and B signals in response to the color separation signals $SP_G$ and $SP_B$. As a result, the switches 32R, 32G and 32B play the role of a multiplexer for producing the multiplexed R, G and B signals on an output 108. The output 108 of the multiplexer is connected to the amplifier 36 and also to ground via the capacitor 234 which holds a potential for a moment. The sample and hold circuit 216 made up of the multiplexer, i.e., switches 32R-32B, capacitor 234 and amplifier 36 as stated above, sequentially samples the color signals in response to the color separation signals $SP_R$, $SP_G$ and $SP_B$, holds the sampled color signals by the capacitor 234, and then delivers them via the output 206 of the amplifier 36. The output 206 is connected to differential amplifiers 222R, 222G and 222B and to an ADC 218 as well.

The differential amplifier 222R has an inverting input 208 connected to a reference voltage source 24 which generates a reference voltage VR, i.e., a target voltage for the output 206 of the sample and hold circuit 216. The differential amplifier 222R compares the voltage of the signal applied to the noninverting input 206 thereof with the reference voltage VR and produces a signal representative of the resulting reference on an output 110R thereof. The output 110R is connected to a switch 226R. The switch 226R opens and closes in response to the clamp signals $CP_R$ sequentially fed from the signal generating circuit 10. The switch 226R has an output terminal 112R connected to a buffer 230R and also to ground via a clamp capacitor 28R. The clamp capacitor 28R stores the voltage applied to the terminal 112R and holds it over the 3H period of the video signals. The buffer 230R amplifies the signal on the input 112R to generate a correction voltage and then produces it on an output 102R.

The differential amplifier 222R, switch 226R, capacitor 28R, buffer 230R and differential amplifier 214R form a feedback path terminating at the sample and hold circuit 216. In this configuration, the voltage representative of the difference between the voltage applied to the noninverting input 206 of the differential amplifier 222R and the reference voltage VR is applied to and stored in the clamp capacitor 28R. As the voltage of the clamp capacitor 28R rises, the difference between the two inputs of the differential amplifier 214R decreases in a relative sense to lower the level on the output 104R of the amplifier 214R. Conversely, on the fall of the voltage of the clamp capacitor 28R, the difference between the inputs of the amplifier 214R increases in a relative sense so as to raise the level on the output 104R. This part of the circuitry, therefore, constitutes a feedback clamp circuit for the R signal. The voltage of the R signal during the clamp period appears on the output 206 of the sample and hold circuit 216 and coincides with the target voltage VR.

A feedback clamp circuit identical with the above-described feedback clamp circuit is also assigned to each of the G and B signals. Specifically, differential amplifiers 222G and 222B, switches 226G and 226B, capacitors 28G and 28B and buffers 230B and 230G clamp respectively the G and B signals in response to the color separation signals $SP_G$ and $SP_B$, delivering the resulting outputs to the associated differential amplifiers 214G and 214B via outputs 102G and 102B.

The ADC 218 samples, in response to the reference signal from the signal generating circuit 10, the voltage applied to the input 206 thereof and quantizes the sampled voltage to generate, for example 10-bit digital data. The digital data is applied to the gamma correction circuit 34 over a bus 114. The gamma correction circuit 34 compensates for the difference between the input characteristic of the image pick-up system and the display characteristic of, for example, a cathode ray tube. Specifically, receiving the digital data free from color signal offsets over the bus 4, the circuit 34 subjects the data to accurate gamma correction. The corrected data from the circuit 34 is fed out over an output bus 122, subjected to various kinds of signal processing, and then written to a memory card, not shown.

A reference will be made to FIGS. 6A-6G for describing a specific operation of the this embodiment. As shown, when the camera with the circuitry 3 is in operation, the signal generating circuit 10 produces color separation signals $SP_R$, $SP_G$ and $SP_B$ on the outputs 90R, 90G and 90B, respectively, and produces clamp signals $CP_R$, $CP_G$ and $CP_B$ on the outputs 92R, 92G and 92B, respectively. As an image is focused onto the CCD image sensors of the image pick-up circuit 12 via the associated color filters, the image sensors convert it into electric signals. As a result, R, G and B signals are respectively fed from the outputs 100R, 100G and 100B of the image pick-up circuit 12 to the noninverting inputs 100R, 100G and 100B of the differential amplifiers 214R, 214G and 214B. How the signals to be applied to the inverting inputs of the differential amplifiers 214R-214B are generated will be described, taking the signal to the inverting input 102R as an example.

Figures 6A, 6B:
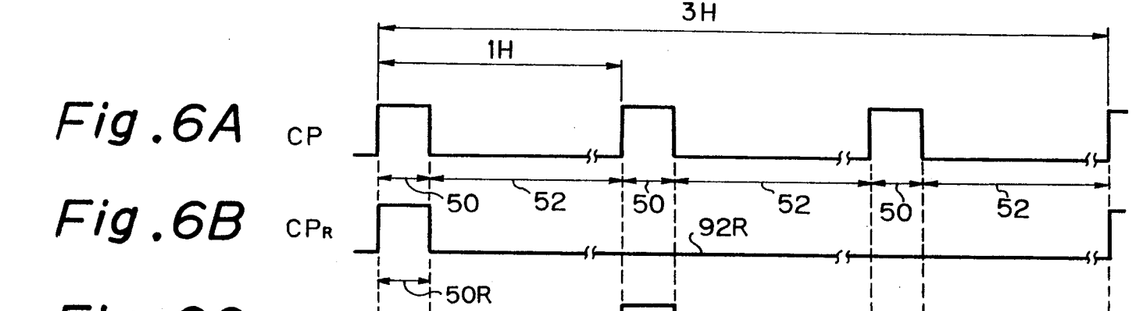
FIGS. 6A–6G are timing charts showing specific signals to be produced by a signal generating circuit included in the embodiment of FIG. 5.
Figures 6C, 6D, 6E:
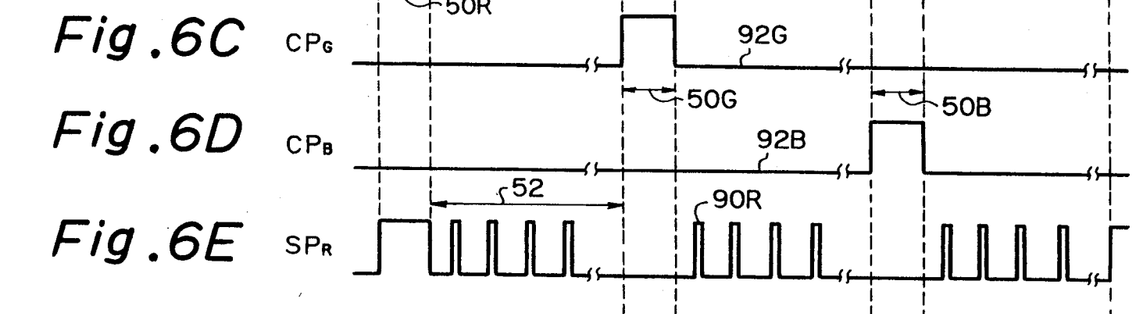
Figure 6F:
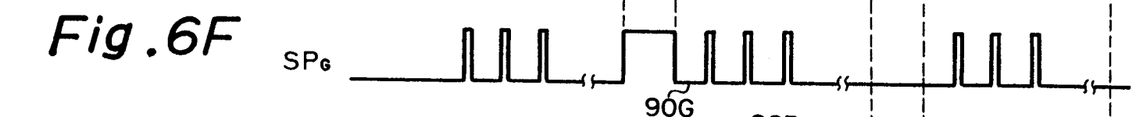
Figure 6G:
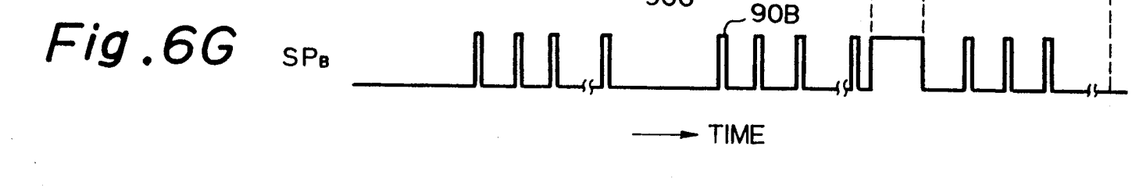
Figures 7A, 7B, 7C, 7D:
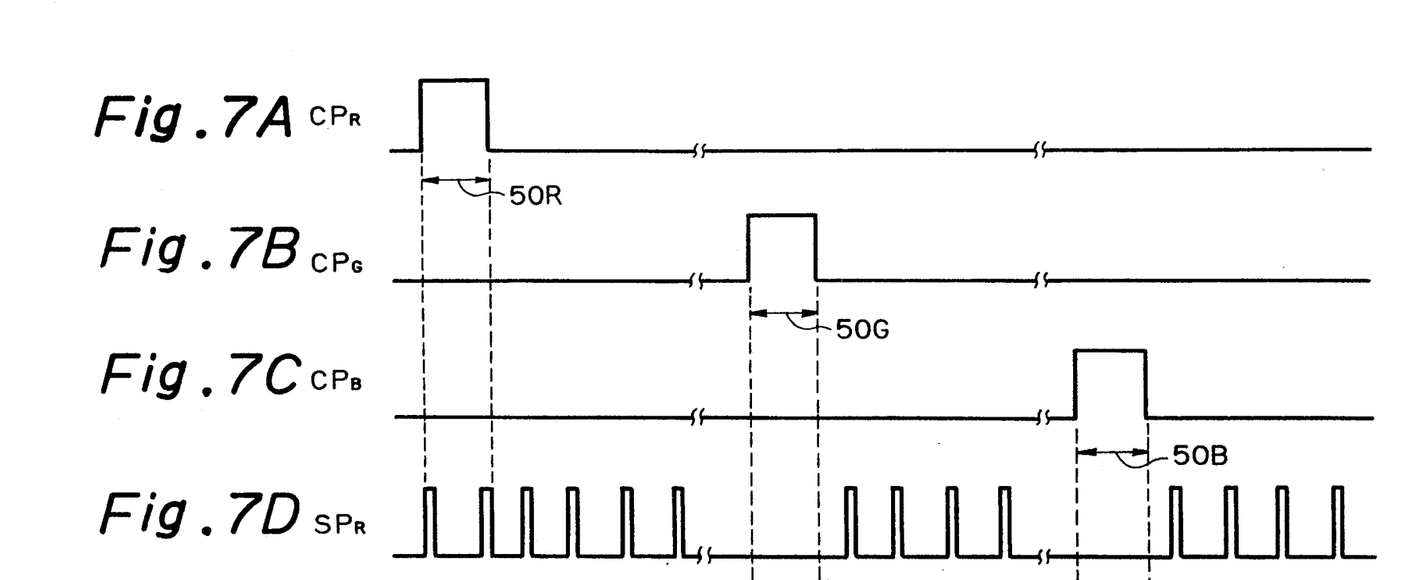
FIGS. 7A–7F are timing charts showing another set of specific signals to be produced by the signal generating circuit.
Figure 7E:
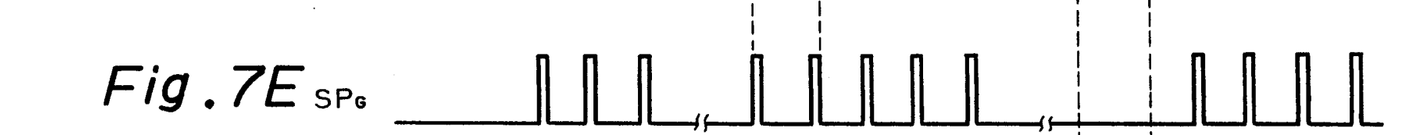
Figure 7F:
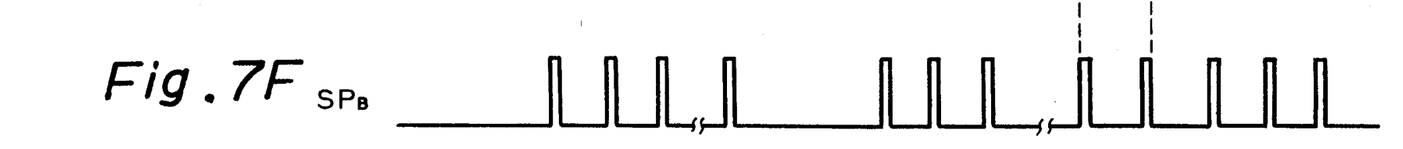

As shown in FIG. 6B, during the first clamp period 50R of the R signal, the differential amplifier 214R produces a voltage representative of a difference between the R signal on the noninverting input 100R and the voltage on the inverting input 102R. This voltage is applied to the switch 32R of the sample and hold circuit 216 via the output 104R of the differential amplifier 214R. In response to the color separation signal $SP_R$, the switch 32R remains turned on during the clamp period 50R with the result that the signal from the differential amplifier 214R is temporarily stored in the capacitor 234. The voltage stored in the capacitor 234 is amplified by the amplifier 36 and then fed to the ADC 218 and the noninverting input of the differential amplifier 222R via the output 206. The differential amplifier 222R compares the voltage on the inverting input thereof with the reference voltage VR from the reference voltage source 24, amplifies their difference, and then produces it on the output 110R. The signal from the amplifier 222R is stored in the clamp capacitor 28R via the switch 226R which has been closed by the clamping signal $CP_R$. The clamp capacitor 28R holds the voltage over a 3H period shown in FIG. 6A. The voltage stored in the clamp capacitor 28R is fed to the buffer 230R and amplified to a predetermined level thereby. This amplified voltage is applied from the output 102R of the buffer 230R to the inverting input 102 of the differential amplifier 214R as a correction voltage.

The differential amplifier 214R amplifies a difference between the correction voltage applied to the inverting input 102R by the above procedure and the R signal fed from the image pick-up circuit 12. In this manner, the R signal is clamped during the clamp period 50R so as to produce a correction voltage, amplified on the basis of the correction voltage, and then delivered via the output 104R. Since the output of the differential amplifier 222R is stored in the clamp capacitor 28R over the 3 H period, amplified by the buffer 230R, and then fed to the inverting input 102R of the differential amplifier 214R, the difference between the R signal and the correction voltage is continuously amplified even after the clamp period 50R. During the next clamp period 50G, the switches 32G and 226G are turned on to generate a correction voltage for the G signal. Further, during the clamp period 50B which follows the period 50G, the switches 32B and 226B are turned on to generate a correction voltage for the B signal. These correction signals are applied to the inverting inputs 102G and 102B of the associated differential amplifiers 214G and 214B. The G signal and B signal are amplified thereby respectively by differential amplifiers 214G and 214B on the basis of the correction voltages and then delivered on the outputs 104G and 104B. The resulting R, G and B signals from the differential amplifiers 214R, 214G and 214B are substantially of the same level due to the correction of their offsets.

During a video period 52 which follows the clamp period 50R, R, G and B signals are fed from the image pick-up circuit 12 to the noninverting inputs 100R, 100G and 100B of the differential amplifiers 214R, 214G and 214B, respectively. Then, the R, G and B signals are each amplified by a particular correction voltage appearing on the associated inverting input 102R, 102G or 102B. The R signal amplified by the differential amplifier 214R appears on the output 104R first. At this time, the switch 32R of the sample and hold circuit 216 is turned on by the color separation signal $SP_{RR}$. As a result, the voltage of the R signal is stored in the capacitor 234 via the output 108 of the switch 32R. The voltage temporarily held in the capacitor 234 is amplified by the amplifier 36 and then fed out via the output 206. Subsequently, the R signal from the sample and hold circuit 216 is converted to 10-bit digital data by the ADC 218 and then applied to the gamma correction circuit 34 in parallel over the bus 114. At this instant, although the signal from the sample and hold circuit 216 is also applied to the noninverting input 206 of the differential amplifier 222R and produced on the output 110R of the amplifier 222R, the switch 226R is not turned on since the clamp signal $CP_R$ is not fed to the switch 226R over the video period 52. Hence, during the video period 52, the voltage stored in the clamp capacitor 28R during the clamp period 50R is applied to the inverting input 102R of the differential amplifier 214R. The G signal, like the R signal, is fed from the differential amplifier 214G to the sample and hold circuit 216 and then to the ADC 218 to be converted to 10-bit digital data. The 10-bit digital data is applied to the gamma correction circuit 34 over the bus 114. Further, the B signal from the differential amplifier 214B is routed through the ADC 218 and bus 114 to the gamma correction circuit 34.

As shown in FIG. 6C, the 1 H period including the clamp period 50R is followed by a clamp period 50G meant for the G signal. In the clamp period 50G, only the G signal is clamped by the color separation signal $SP_G$ and clamp signal $CP_G$ from the signal generating circuit 10 in the same manner as in the clamp period 50R. During a video signal 52 following the period 50G, the G signal is amplified on the basis of a correction voltage generated during the period 50G. Subsequently, as shown in FIG. 6D, the B signal is clamped during a clamp period 50B while a correction voltage is generated. During a video period 52 following the clamp period 50B, the G signal is amplified by the correction voltage. It is to be noted that the correction voltage meant for the R signal is continuously held by the clamp capacitor 28R until the B signal clamp period 50 and subsequent video period 52 expire. Stated another way, this embodiment clamps each of the three color signals R, G and B every 3 H period.

By the above procedure, the R, G and B signals substantially free from offset components are applied to the input 206 of the ADC 218. These color signals are sequentially converted to 10-bit digital data by the ADC 218. The digital R, G and B data are sequentially subjected to gamma correction by the gamma correction circuit 34 and then written into a memory card, not shown, by way of various kinds of signal processing.

As stated above, in the illustrative embodiment, a particular feedback clamp circuit matching one of the multiplexed R, G and B signals is activated to store a correction voltage in the associated clamp capacitor 28. The differential amplifier 214 amplifies the input color signal on the basis of the correction voltage. During the next clamp period 50, another feedback clamp circuit matching another color signal is activated to clamp the color signal. In this manner, the differential amplifiers 214 correct offsets among the color signals on the basis of the color-by-color correction signals. Sequentially clamping the color signals during different clamp periods assigned thereto as stated above is successful in bringing offset components among the color signals to coincidence with accuracy and without resorting to adjustment. This insures the accurate registration of the color components. Particularly, in the processing to be executed by the gamma correction circuit 20, the color balance of video data lying in a comparatively low luminance range is improved to prevent color reproducibility from being degraded. It is not necessary for the operator of the equipment to manipulate a video signal inputting circuit for the accurate adjustment of offset correction. Moreover, since the offset correction and level correction are executed before the digitization of the color signals, the resolution and, therefore, the dynamic range available with the ADC 18 can be used to the full extent. This leads to the improvement in the reproducibility of an image.

In this embodiment, the signal generating circuit 10 generates the color separation signals $SP_R$, $SP_G$ and $SP_B$ each going high in synchronism with the clamp period 50 meant for the associated color signal, as shown in FIGS. 6E-6G. Alternatively, as shown in FIGS. 7A-7F, the circuit 10 may be so constructed as to sequentially generate color separation signals $SP_R$, $SP_G$ and $SP_B$ each going high at an interval in the clamp period 50 of the associated color signal; the signals $SP_R$, $SP_G$ and $SP_B$ turn on and turn off the switches 32R, 32G and 32B, respectively. In such a case, the capacitor 234 of the sample and hold circuit 216 will hold the voltage stored therein during the interval between the successive color separation signals.

In the previously described two embodiments, a plurality of color signals are also multiplexed for one line circuit and then digitized. The clamp level data are detected out of the digital video signals color by color to thereby produce correction data for correcting offsets. Offsets among the color signals are substantially eliminated on the basis of the correction data. This is also successful in cancelling color deviation components included in the data of the video signals. Especially, the color balance of video data lying in a comparatively low luminance range is improved to prevent color reproducibility from being degraded. Moreover, it is not necessary for the operator of the equipment to manipulate a video signal inputting circuit for the accurate adjustment of offset correction.

In summary, it will be seen that the present invention provides video signal offset cancelling circuitry which extracts data of digitized color signals, produces a mean value of the clamp levels of each data, and then corrects offsets among the color signals. The circuitry, therefore, successfully cancels the deviations of the reference levels of the color signals. Further, the circuitry of the invention sequentially clamps the color signals every clamp period to cause the offsets of the color signals to coincide. This is also successful in cancelling the deviation of the reference levels of the color signals. Hence, in gamma correction to follow, the color balance of video data lying in a comparatively low luminance range is improved to prevent color reproducibility from being degraded. In addition, it is not necessary for the operator of the equipment to manipulate a video signal inputting circuit for the accurate adjustment of offset correction.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An offset cancelling circuit for correcting offsets in reference levels of a plurality of video signals fed from image pick-up means, each of the video signals being associated with a respective color, the offset cancelling circuit comprising:

signal generating means for generating color separation pulses in synchronism with a reference clock generated by said signal generating means and for generating clamp pulses and clock pulses in synchronism with black-out periods of the video signals;

multiplexing means for multiplexing the video signals from the image pick-up means into serial video signals in response to said color separation pulses from said signal generating means, clamping said serial video signals in response to said clamp pulses from said signal generating means, and converting said clamped video signals to produce digital video signals;

video signal detecting means for detecting, in response to said clamp pulses from said signal generating means, said digital video signals of respective colors;

mean value calculating means for calculating a mean value of clamp levels of each of said digital video signals detected by said video signal detecting means, and for sequentially selecting the mean values via selector means in response to said color separation pulses from said signal generating means; and correcting means for correcting the offsets among the video signals on the basis of said mean values.

2. The offset cancelling circuit as claimed in claim 1, wherein said correcting means comprises calculating means for subtracting a mean value from an associated one of the video signals.

3. The offset cancelling circuit as claimed in claim 1, wherein said correcting means comprises:

a plurality of amplifying means each being associated with a respective one of the video signals for correcting a DC level of the respective video signal in response to a DC voltage applied to a control input;

a plurality of correction data generating means each being associated with a respective one of the video signals for generating correction data from the mean value for correcting the offset of the respective video signal;

a plurality of converting means each being associated with a respective one of the video signals for converting the correction data of the respective video signal to an analog voltage; and a plurality of feedback means each being associated with a respective one of the video signals for feeding back the analog voltage of the respective video signal to the control input of an associated one of said plurality of amplifying means as the DC voltage.

4. The offset cancelling circuit as claimed in claim 3, wherein said multiplexing means multiplexes the video signals amplified by said plurality of amplifying means into said serial video signals.

5. The offset cancelling circuit as claimed in claim 4, wherein said multiplexing means comprises digitizing means for converting said serial video signals into the digital video signals.

6. An offset cancelling circuit for correcting differences in reference levels of a plurality of video signals each being associated with a respective color, the offset cancelling circuit comprising:

a plurality of amplifying means each being associated with a respective one of the video signals for correcting a DC level of the respective video signal in response to a respective DC voltage applied to a control input;

multiplexing means for sequentially selecting and multiplexing the video signals amplified by said plurality of amplifying means to output serial video signals;

voltage generating means for generating a reference voltage which constitutes a target for voltages of said serial video signals outputted by said multiplexing means;

a plurality of feedback means each being associated with a respective one of the video signals for clamping the voltage of a respective serial video signal outputted by said multiplexing means not lying in a video period to produce the respective DC voltage matching a difference between the voltage of the respective serial video signal and said reference voltage; and a plurality of voltage storing means each being associated with a respective one of the video signals for storing the respective DC voltage until the next serial video signal of corresponding color arrives and for applying the respective DC voltage to said control input of a respective one of said plurality of amplifying means.

7. The offset cancelling circuit as claimed in claim 6, wherein said multiplexing means comprises sampling and holding means for sampling and temporarily holding the video signals outputted by said plurality of amplifying means.

8. The offset cancelling circuit as claimed in claim 6, further comprising:

means for driving one of said plurality of feedback means at a time; and means for driving said multiplexing means such that one of the video signals corresponding to said one of said plurality of feedback means is outputted from said multiplexing means as said serial video signal.

9. The offset cancelling circuit as claimed in claim 8, further comprising means for driving said multiplexing means continuously.

10. The offset cancelling circuit as claimed in claim 8, further comprising means for driving said multiplexing means intermittently.

* * * * *